US012697732B2

(12) United States Patent
Bokeloh et al.

(10) Patent No.: US 12,697,732 B2
(45) Date of Patent: Aug. 4, 2026

(54) SENSOR-BASED ADAPTATION FOR MANIPULATION OF DEFORMABLE WORKPIECES

(71) Applicant: Intrinsic Innovation LLC, Mountain View, CA (US)

(72) Inventors: Martin Bokeloh, Munich (DE); Martina Marek, Munich (DE); Stefan Hinterstoisser, Munich (DE); Olivier Pauly, Munich (DE); Hauke Heibel, Höhenkirchen-Siegertsbrunn (DE)

(73) Assignee: Intrinsic Innovation LLC, Mountain View, CA (US)

( * ) Notice: Subject to any disclaimer, the term of this patent is extended or adjusted under 35 U.S.C. 154(b) by 89 days.

(21) Appl. No.: 18/537,702

(22) Filed: Dec. 12, 2023

(65) Prior Publication Data

US 2024/0208067 A1 Jun. 27, 2024

Related U.S. Application Data

(60) Provisional application No. 63/435,469, filed on Dec. 27, 2022.

(51) Int. Cl.
*B25J 9/16* (2006.01)
*G06T 17/00* (2006.01)

(52) U.S. Cl.
CPC ............. *B25J 9/1697* (2013.01); *G06T 17/00* (2013.01)

(58) Field of Classification Search
CPC .... B25J 9/1697; G06T 17/00; G06T 2210/56; G06T 2219/2021; G06T 19/20
See application file for complete search history.

(56) References Cited

U.S. PATENT DOCUMENTS

| | | | | |
|---|---|---|---|---|
| 4,641,972 A | * | 2/1987 | Halioua | ............. G01B 11/2527 250/237 G |
| 4,704,694 A | * | 11/1987 | Czerniejewski | ....... B25J 9/1697 356/388 |

(Continued)

FOREIGN PATENT DOCUMENTS

| | | | | |
|---|---|---|---|---|
| CA | 3129754 C | * | 8/2025 | |
| EP | 182469 A | * | 5/1986 | |

(Continued)

OTHER PUBLICATIONS

"Deformable shape registration using surface-based free-form deformations in robotic welding;" Kuss et al., 2017 IEEE International Conference on Advanced Intelligent Mechatronics (AIM) (2017, pp. 885-890); Jul. 1, 2017. (Year: 2017).*

(Continued)

*Primary Examiner* — Khoi H Tran
*Assistant Examiner* — Jorge O Peche
(74) *Attorney, Agent, or Firm* — Fish & Richardson P.C.

(57) ABSTRACT

Methods, systems, and apparatus, including computer programs encoded on computer storage media, for performing deformation modeling with edge-to-edge constraints. One of the methods includes computing edge-to-edge constraints that match one or more edges in point cloud data to one or more edges in a nominal representation of a workpiece. A current estimate of the deformation data is repeatedly updated according to the computed edge-to-edge constraints. A robotic manipulation task is then performed according to the generated deformation data.

19 Claims, 6 Drawing Sheets

Nominal representation of workpiece
202
220a
210a
220b
210b
Deformed workpiece
204
Robot 1
230
Robot 2
240

(56) References Cited

U.S. PATENT DOCUMENTS

| | | | | |
|---|---|---|---|---|
| 5,380,978 | A * | 1/1995 | Pryor | B23K 26/0846<br>219/121.79 |
| 5,499,306 | A * | 3/1996 | Sasaki | G06T 7/74<br>382/153 |
| 5,588,098 | A * | 12/1996 | Chen | G06T 19/20<br>345/653 |
| 5,818,452 | A * | 10/1998 | Atkinson | G06T 19/20<br>345/441 |
| 5,828,575 | A * | 10/1998 | Sakai | G05B 19/4097<br>700/182 |
| 5,864,482 | A * | 1/1999 | Hazama | G05B 19/4097<br>700/95 |
| 5,886,897 | A * | 3/1999 | Hazama | G05B 19/4097<br>700/182 |
| 5,971,589 | A * | 10/1999 | Hazama | G06T 19/20<br>700/165 |
| 6,209,864 | B1 * | 4/2001 | Taniguchi | B65H 31/34<br>270/58.11 |
| 6,625,330 | B1 * | 9/2003 | Dubey | G06V 10/752<br>382/293 |
| 7,221,983 | B2 * | 5/2007 | Watanabe | G05B 19/41815<br>718/104 |
| 7,236,618 | B1 * | 6/2007 | Chui | G06T 19/00<br>382/128 |
| 7,236,854 | B2 * | 6/2007 | Pretlove | G05B 19/42<br>318/568.22 |
| 7,590,512 | B2 * | 9/2009 | Shimada | G06T 17/20<br>703/2 |
| 7,819,399 | B2 * | 10/2010 | Choi | B65H 9/002<br>271/227 |
| 7,881,917 | B2 * | 2/2011 | Nagatsuka | G05B 19/4069<br>703/7 |
| 8,149,237 | B2 * | 4/2012 | Nakao | G06T 19/20<br>345/428 |
| 8,996,175 | B2 * | 3/2015 | Blumberg | G05B 19/42<br>901/3 |
| 9,002,098 | B1 * | 4/2015 | Chelian | G06V 10/422<br>382/153 |
| 10,002,420 | B2 * | 6/2018 | Groth | G06T 7/0012 |
| 10,607,334 | B2 * | 3/2020 | Middlebrooks | G03F 7/705 |
| 11,144,034 | B2 * | 10/2021 | Shi | G06F 30/00 |
| 11,288,472 | B2 * | 3/2022 | Rodriguez | G06V 30/2247 |
| 11,511,419 | B2 * | 11/2022 | Kelch | B25J 9/1661 |
| 11,654,571 | B2 * | 5/2023 | Yoneyama | B25J 9/1697<br>700/259 |
| 11,794,343 | B2 * | 10/2023 | Marthi | B25J 9/1676 |
| 11,906,483 | B2 * | 2/2024 | Agnello | G01N 3/20 |
| 12,067,080 | B2 * | 8/2024 | Eyjolfsdottir | G06V 20/10 |
| 12,454,065 | B1 * | 10/2025 | Raaj | B25J 13/089 |
| 2007/0001638 | A1 * | 1/2007 | Gray | B25J 9/1692<br>318/568.11 |
| 2007/0106421 | A1 * | 5/2007 | Kamrani | B25J 9/1661<br>700/245 |
| 2007/0282485 | A1 * | 12/2007 | Nagatsuka | G05B 19/4069<br>700/245 |
| 2010/0061783 | A1 * | 3/2010 | Kawasaki | B65H 9/002<br>271/228 |
| 2014/0253720 | A1 * | 9/2014 | Li | G05B 19/402<br>348/95 |
| 2015/0310601 | A1 * | 10/2015 | Rodriguez | G06Q 20/208<br>348/150 |
| 2016/0086343 | A1 * | 3/2016 | Namiki | G06V 10/60<br>348/135 |
| 2017/0097232 | A1 * | 4/2017 | Anderson-Sprecher | B25J 5/007 |
| 2017/0336713 | A1 * | 11/2017 | Middlebrooks | G03F 7/705 |
| 2017/0345138 | A1 * | 11/2017 | Middlebrooks | G03F 7/705 |
| 2017/0355078 | A1 * | 12/2017 | Ur | G06V 10/751 |
| 2018/0025501 | A1 * | 1/2018 | Endo | G06T 3/153<br>382/154 |
| 2020/0019864 | A1 * | 1/2020 | Gu | B25J 9/1697 |
| 2020/0167905 | A1 * | 5/2020 | Bian | G01N 21/91 |
| 2020/0269428 | A1 * | 8/2020 | Ukisu | B65B 5/108 |
| 2020/0376860 | A1 * | 12/2020 | Paker | B65H 9/103 |
| 2021/0122045 | A1 * | 4/2021 | Handa | B25J 13/084 |
| 2021/0129334 | A1 * | 5/2021 | Kanunikov | B65G 61/00 |
| 2021/0157998 | A1 * | 5/2021 | Rodriguez | G06V 20/20 |
| 2021/0192162 | A1 * | 6/2021 | Rodriguez | G06Q 20/201 |
| 2021/0239584 | A1 * | 8/2021 | Agnello | G01N 3/068 |
| 2022/0084188 | A1 * | 3/2022 | Onishi | G06T 7/0004 |
| 2022/0288774 | A1 * | 9/2022 | Gong | B25J 9/1664 |
| 2022/0347790 | A1 * | 11/2022 | Reichl | G01N 21/954 |
| 2022/0347843 | A1 * | 11/2022 | Ahire | G06T 7/60 |
| 2022/0371190 | A1 * | 11/2022 | Gong | B25J 19/023 |
| 2023/0166406 | A1 * | 6/2023 | Landi | B25J 13/089<br>382/153 |
| 2023/0182293 | A1 * | 6/2023 | Shaw | B25J 15/0616<br>700/245 |
| 2023/0381961 | A1 * | 11/2023 | Ahire | B24B 49/16 |
| 2024/0139961 | A1 * | 5/2024 | Gaschler | B25J 9/1697 |
| 2024/0208067 | A1 * | 6/2024 | Bokeloh | G06T 19/20 |
| 2024/0217102 | A1 * | 7/2024 | Vilaj | B25J 9/026 |
| 2024/0264540 | A1 * | 8/2024 | Van de Kerkhof | H01L 21/67748 |
| 2024/0408761 | A1 * | 12/2024 | Iwanaga | B25J 15/0616 |
| 2025/0050508 | A1 * | 2/2025 | Dong | B25J 19/023 |
| 2025/0360628 | A1 * | 11/2025 | Ahmadi | B25J 9/1697 |

FOREIGN PATENT DOCUMENTS

| | | | | | |
|---|---|---|---|---|---|
| EP | 960744 | A2 | * | 12/1999 | |
| EP | 3531055 | B1 | * | 12/2020 | F28F 21/084 |
| JP | 2016169104 | A | * | 9/2016 | |
| WO | WO-2021145888 | A1 | * | 7/2021 | G06F 30/27 |

OTHER PUBLICATIONS

"Combining Self-Organizing and Graph Neural Networks for Modeling Deformable Objects in Robotic Manipulation;" Valencia et al., Frontiers in Robotics and AI, 7, 600584; Dec. 23, 2020. (Year: 2020).*

"DeformerNet based 3D Deformable Objects Shape Servo Control for Bimanual Robot Manipulation;" Yang et al.; 2024 IEEE International Conference on Industrial Technology (ICIT) (2024, pp. 1-7); Mar. 25, 2024 (Year: 2024).*

JP 2016169104 A—Machine Translation (Year: 2016).*

Developer.nvidia.com [online], "NVIDIA Modulus: An AI-Accelerated Multiphysics Simulation Toolkit," May 26, 2020, retrieved on Jun. 11, 2024, retrieved from URL<https://developer.nvidia.com/blog/modulus-an-ai-accelerated-multiphysics-simulation-toolkit/>, 5 pages.

Doc.cgal.org [online], "CGAL 5.6.1—3D Mesh Generation," Nov. 6, 2013, retrieved on Jun. 27, 2024, retrieved from URL<https://doc.cgal.org/latest/Mesh_3/index.html>, 21 pages.

Gamma.cs.unc.edu [online], "Classification of Prostate Cancer Grades and T-Stages based on Tissue Elasticity Using Medical Image Analysis," Mar. 1, 2017, retrieved on Jun. 11, 2024, retrieved from URL<https://gamma.cs.unc.edu/CancerClass/>, 2 pages.

Igl.ethz. [online], "Interactive Shape Modeling and Deformation," 2009, retrieved on Jun. 11, 2024, retrieved from URL<https://igl.ethz.ch/projects/deformation-survey/eg09_tutorial_slides.pdf/>, 205 pages.

Muller et al., "A robust method to extract the rotational part of deformations," MIG '16: Proceedings of the 9th International Conference on Motion in Games, Oct. 2016, pp. 55-60.

mvtec.com [online], "create deformable surface model (Operator)," Feb. 25, 2021, retrieved on Jun. 11, 2024, retrieved from URL<https://www.mvtec.com/doc/halcon/13/en/create_deformable_surface_model.html/>, 3 pages.

Sorkine et al., "As-Rigid-As-Possible Surface Modeling," Eurographics Symposium on Geometry Processing, Jul. 4, 2007, 4:109-116.

* cited by examiner

SENSOR-BASED ADAPTATION FOR MANIPULATION OF DEFORMABLE WORKPIECES

CROSS-REFERENCE TO RELATED APPLICATION

This application claims priority to U.S. Provisional Application No. 63/435,469, filed on Dec. 27, 2022. The disclosure of the prior application is considered part of and is incorporated by reference in the disclosure of this application.

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Many robotics tasks rely on fixtures to hold workpieces in a fixed position and orientation while the task is being performed. However, each workpiece generally requires a separately designed and built fixture. The time and complexity of building fixtures is thus only feasible for workpieces that will be massively produced.

Instead of using fixtures, some robotic installations rely on sensor data to determine the pose of a workpiece in real time. To do so, the system can use a canonical representation of the workpiece design to determine, from matching sensor data to the canonical representation, the most likely position and orientation of the workpiece.

However, not all workpieces are perfectly rigid. Many workpieces are instead deformable workpieces that can bend and flex in substantial ways during the robotic process. Examples include workpieces made of rubber or other similarly flexible material and sheets of metal or plastic that naturally flex due to the forces of robots or gravity.

Some deformation models attempt to solve this problem by relying on point cloud data of the workpiece, and then they attempt to match the points of the workpiece in the point cloud captured in real-time to keypoints on the canonical representation of the workpiece. However, this approach is very unreliable for many types of workpieces, particularly those having highly planar shapes. This is because it is difficult to discern which points match which other points when many points lie along the same plane. Thus, the canonical representation can figuratively slide around the real-time point cloud data like a tablecloth on a table while all the while producing equally plausible poses of the workpiece according to the point cloud deformation model.

SUMMARY

This specification describes how a system can use enhanced deformation models that provide for performing highly accurate and reliable robotic manipulation tasks on deformable workpieces. In one aspect, the system can use edge-to-edge constraints between edges of a nominal representation of a workpiece and edges detected in 3D point cloud data. This information makes the resulting deformation much more reliable and stable, in addition to generally being faster to optimize.

Particular embodiments of the subject matter described in this specification can be implemented so as to realize one or more of the following advantages. The deformation modeling techniques described in this specification enhance the capability of robotic processes to perform fixture-free manipulation tasks on deformable workpieces. These advances provide robotics processes with the precision of a custom-designed fixture but without the corresponding cost of designing and building the fixture. The edge-to-edge constraints described below are well-suited to being used in the real-world as well as in simulation, which not only makes the overall deformation process more accurate and reliable, but also opens up other potential applications for deformation modeling, such as selecting sensor locations in a workcell based on the quality of deformation models that are generated for sensors in particular candidate locations. In addition, the deformation modeling techniques described below are precise enough to be used for real-time quality checks, for example, to determine whether a particular workpiece is too deformed and should be rejected.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
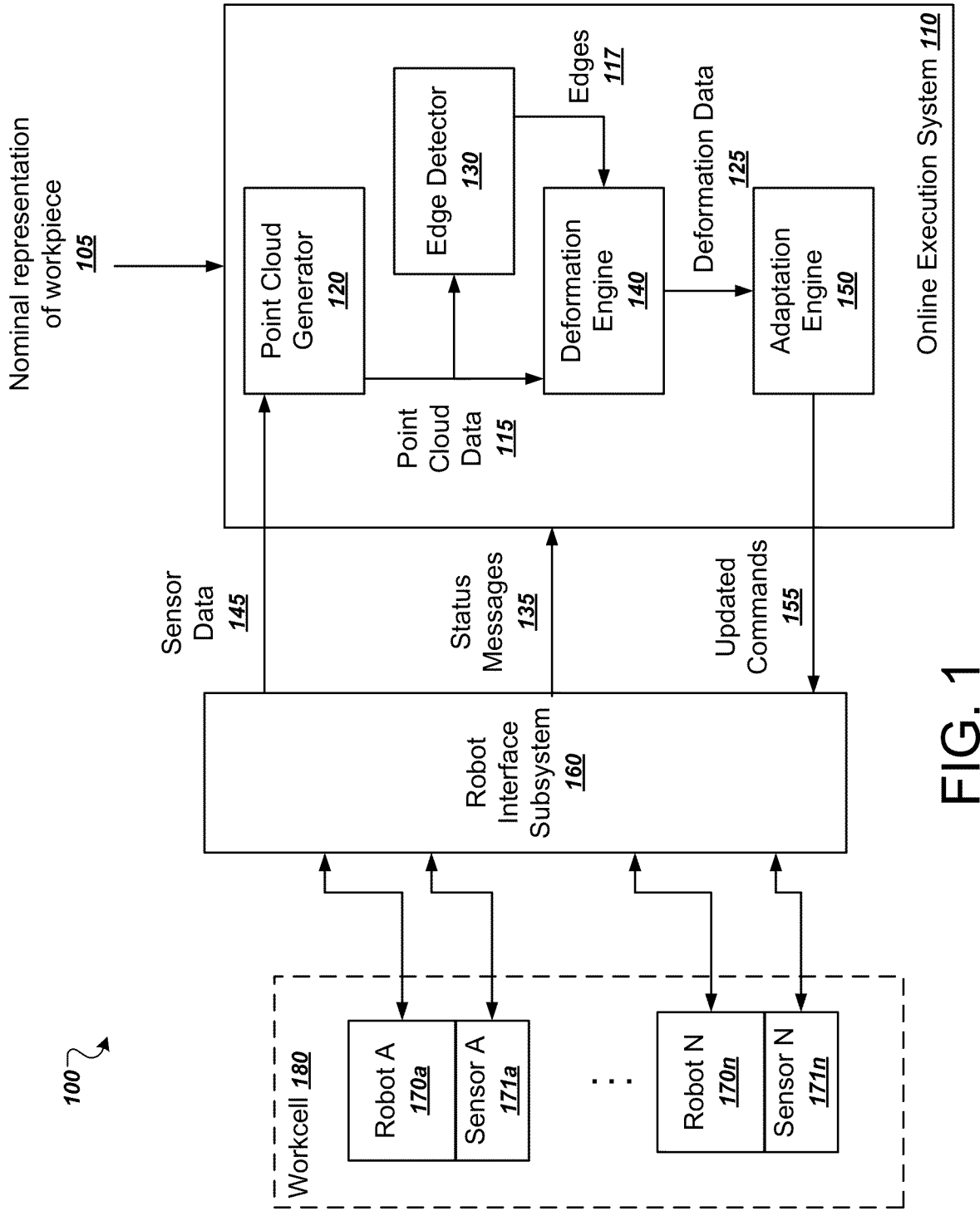
FIG. 1 is a diagram that illustrates an example system.

FIG. 1 is a diagram that illustrates an example system 100. The system 100 is an example of a system that can implement the deformation model techniques described in this specification.

The system 100 includes a number of functional components, including an online execution system 110 and a robot interface subsystem 160. The online execution system 110 includes a point cloud generator 120, an edge detector 130, a deformation engine 140, and an adaptation engine 150. Each of these components can be implemented as computer programs installed on one or more computers in one or more locations that are coupled to each other through any appropriate communications network, e.g., an intranet or the Internet, or combination of networks.

In general, the online execution system 110 provides updated commands 155 to be executed by the robot interface subsystem 160, which drives one or more robots, e.g., robots 170a-n, in a workcell 180. In order to compute the commands 155, the online execution system 110 consumes status messages 135 generated by the robots 170a-n and sensor data 145 made by one or more sensors 171a-n making observations within the workcell 180. As illustrated in FIG. 1, each sensor 171 is coupled to a respective robot 180. However, the sensors need not have a one-to-one correspondence with robots and need not be coupled to the robots. In fact, each robot can have multiple sensors, and the sensors can be mounted on stationary or movable surfaces or robots within the workcell 180.

The online execution system 110 can use a deformation engine 130 to generate deformation models of workpieces that are being manipulated in the workcell 180. In this specification, a deformation model represents how an object, e.g., a workpiece, differs from a nominal representation of the object. In the context of robotics, the deformable objects to be modeled are typically workpieces to be manipulated by robotic processes. However, the same techniques described in this specification can be used to model other deformable objects that are not workpieces in a robotic process.

The nominal representation of the object is a digital representation of an undeformed object, which can be an ideal digital representation of an object. The nominal representation can be any appropriate digital representation of an object, e.g., a 3D computer-aided design (CAD) model or a 3D scan of a representative object. A deformation model thus defines a function that maps 3D space to 3D space. In some implementations, the deformation engine can use a mesh-less finite element method (FEM). Alternatively or in addition, other methods can be used if they provide physically-based deformations and allow (' continuous mapping to guarantee no or a minimal amount of discontinuities.

A mesh-less finite element deformation model represents the deformation from a nominal representation of an object to an input representation of an object, which may have an initially unknown deformation. The input representation of an object is often a representation generated from sensor data, e.g., point cloud or 3D scanning data. However, the deformation model can also be used to model the deformation between other representations, e.g., between different digital CAD models.

A mesh-less finite element deformation model can be parameterized by a set of node points xi and a set of control points $u_i$. Each node point x represents a point in 3D space around the surface of the nominal representation of an object. Each node point x has a corresponding control point u on the surface of the input representation whose deformation is to be modeled.

The deformation field can then be modeled as a linear combination of nodes according to:

$$f(x) = x + \sum_i^N \Phi_i(x)u_i,$$

where N is the number of node points, and each $\Phi_i(x)$ is a shape function that defines the influence of each control point on f(x). In some implementations, the shape functions generate only non-negative values and sum to 1 for the N node points.

In order to compute the deformation data, the deformation engine 140 can use a variety of constraints, including point-to-plane constraints and edge-to-edge constraints. Thus, the deformation engine 140 can take as inputs point cloud data 115 generated by the point cloud generator 120 as well as edges 117 generated by the edge detector 130. The process of generating the deformation field from these constraints is described in more detail below.

In operation, the online execution system 110 can receive a nominal representation 105 of a workpiece to be manipulated by one or more robots 170 in the workcell 180. The online execution system 110 can then receive sensor data

145, e.g., from a 3D camera, and can use the point cloud generator 120 to process the sensor data 145 to generate point cloud data 115.

The edge detector 130 can receive the point cloud data 115 and can extract edges 117. In some implementations, the edge detector classifies edges as being interior edges occurring in the interior of the object or silhouette edges occurring on the outside edges of the object. The classification of edges into interior or silhouette edges can result in more accurate deformation data. This process is described in more detail below.

The deformation engine 140 can receive the edges 117 and the point cloud data 115 can perform an iterative process to find parameters of the deformation model that most closely match the sensor data 145. The deformation engine 140 can then generate deformation data 125 representing those parameters.

The adaptation engine 150 can receive the deformation data 125 can use it in a variety of ways. For example, the adaptation engine 150 can use the deformation data 125 to generate a very precise updated plan for the workpiece represented in the sensor data. Thus, the adaptation engine can update a gluing path, a grasping point, a welding point, a sanding area, or a bin packing plan, to name just a few examples.

Alternatively or in addition, the adaptation engine 150 can use the deformation data 125 to perform higher level functions, e.g., rejecting the workpiece as being too deformed to be reliably manipulated by the robots. In that case, the adaptation engine 150 can cause the system to trigger a fault recovery process, e.g., by having human intervention to remove the faulty workpiece or simply by having the robots automatically discard the workpiece.

As another example, the adaptation engine 150 can indicate that the deformation data 125 is not reliable enough for the manipulation task to proceed. For example, it's possible that the sensor data was obtained by a temporarily or partially occluded sensor. Or it's possible that the orientation of that particular workpiece when the sensor data was captured was not ideal for generating the deformation data. Either way, the adaptation engine can cause the system to trigger a fault recovery process, e.g., by having the workpiece repositioned or inspected manually by human operators.

Figure 2:
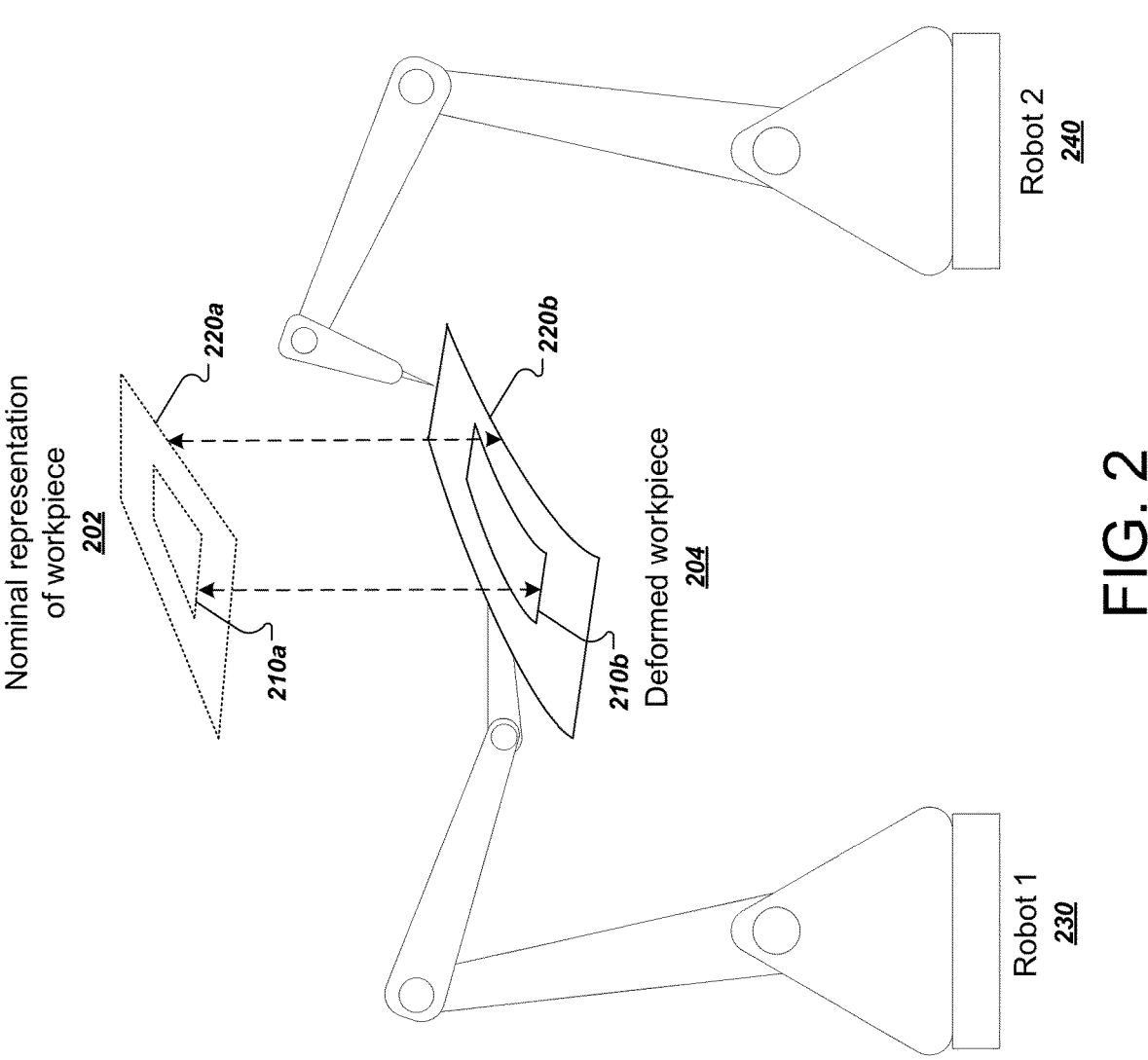
FIG. 2 illustrates edge-to-edge constraints between a deformed workpiece and its nominal representation.

FIG. 2 illustrates edge-to-edge constraints between a deformed workpiece 204 and its nominal representation 202.

FIG. 2 illustrates a common scenario that causes deformation of workpieces in a workcell. In this example, a first robot 230 is holding a deformable workpiece 204, and the simple force of gravity causes the deformable workpiece 204 to curve and bend downward at its ends. A second robot 240 is configured to perform a manipulation task on the deformable workpiece 204 held by the first robot 230, e.g., to apply glue to the edges around the deformable workpiece. A nominal representation 202 of the workpiece is illustrated in FIG. 2 using dashed lines to indicate that the nominal workpiece is a digital representation.

Edge-to-edge constraints establish a correspondence between edges detected in the deformable workpiece 204 and edges in the nominal representation 202. In this case, the workpiece has both internal edges and silhouette edges. For example, the deformable workpiece 204 has an internal edge 210*b*. An edge-to-edge constraint can generate a correspondence between the internal edge 210*b* of the deformable workpiece 204 and an internal edge 210*a* of the nominal representation 202. Similarly, the deformable workpiece 204 has a silhouette edge 220*b*. An edge-to-edge constraint can also generate a correspondence between the silhouette edge 220*b* of the deformable workpiece 204 and a silhouette edge 220*a* of the nominal representation 202. As will be described in more detail below, a system can improve the accuracy of deformation data by giving more weight to internal edges than silhouette edges when using edge-to-edge constraints in a deformation model.

Figure 3:
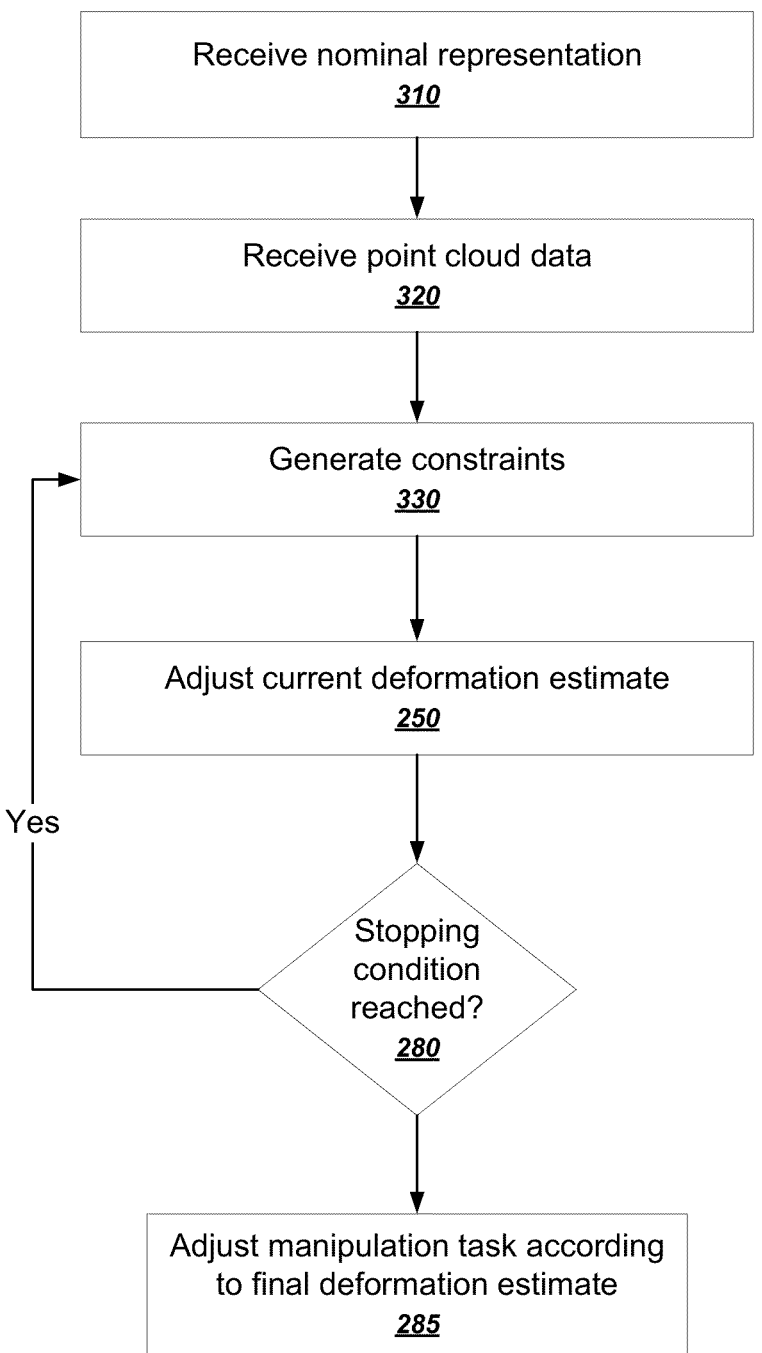
FIG. 3 is a flowchart of an example process for generating deformation data for a deformable workpiece.

FIG. 3 is a flowchart of an example process for generating deformation data for a deformable workpiece. The examiner process can be performed by a system of one or more computers in one or more locations programmed in accordance with this specification. The example process will be described as being performed by a system of one or more computers.

The system receives a nominal representation of a workpiece (310). As described above, the workpiece can be one that will be involved in a robotic process that involves one or more robots performing a manipulation task on multiple instances of the workpiece. The nominal representation can represent the geometry of the workpiece before deformation.

The system receives point cloud data captured by a sensor for a deformed workpiece (320). For example, the system can use a depth camera to capture a point cloud data in the form of a depth map.

The system can then perform an iterative process that uses edge-to-edge constraints to generate deformation data for the deformed workpiece. Generally the deformation data represents how the deformed workpiece differs from the nominal representation of the workpiece.

The system generates constraints (330). The system can use a number of different constraints, including point-to-plane constraints and edge-to-edge constraints. The constraints affect the search for control points that best minimize an objective function when generating a new estimation of the deformation.

Point-to-plane constraints establish a correspondence between a point in the sensor data and a relatively planar surface of the nominal workpiece. To find point-to-plane constraints, the current deformation estimate can be applied to a set of sample points of the nominal workpiece. Applying the deformation estimate alters their position in space. Then, the closest data point in the sensor data having a similar normal vector is found for each point. If no such data point can be found, the data point can be ignored. This can happen, e.g., due to occlusions in the sensor data or non-ideal orientations of the workpiece. In some implementations, the system can also ignore surface points that are hidden or invisible to the sensor by first rendering the deformed workpiece and only considering visible points.

If a corresponding point was found, the system can generate a quadratic point-to-plane constraint for each such pair x, and ci according to:

$$\sum_{i}^{N}(f(x_i) - c_i)^T Q_i (f(x_i) - c_i),$$

where $n_i$ is the normal vector for the point and $Q_i$ is given by:

$$Q_i = n_i n_i^T + I * c,$$

where I is the identity matrix and c is a small constant that imposes a weak identity constraint, e.g., 0.1, 0.001, 0.0001, to name just a few examples.

Edge-to-edge constraints establish a correspondence between an edge precomputed for the nominal workpiece and an edge extracted from the point cloud data. Edge-to-edge constraints can result in much higher precision than using point-based constraints only, and can get rid of the problem of the surface of the nominal workpiece tending to slide over the data points like a tablecloth pulled over a table. In addition, using edge-to-edge constraints makes the optimize converge faster as it pulls the deformation model toward the data faster than using point-to-plane constraints alone.

As mentioned briefly above, the system can treat edges classified as internal edges differently from edges classified as silhouette edges.

Figure 4A:
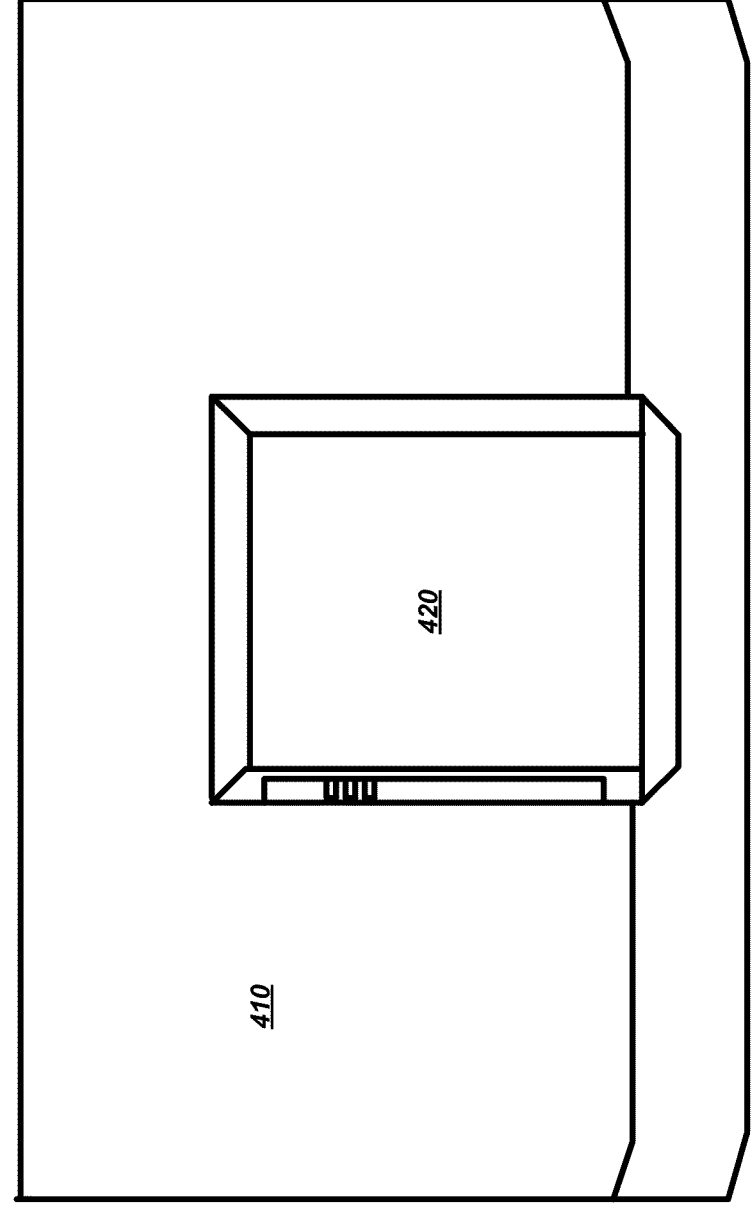
FIGS. 4A, 4B, and 4C illustrate how edges extracted from point cloud data can be classified.
Figure 4A:
Figure 4B:
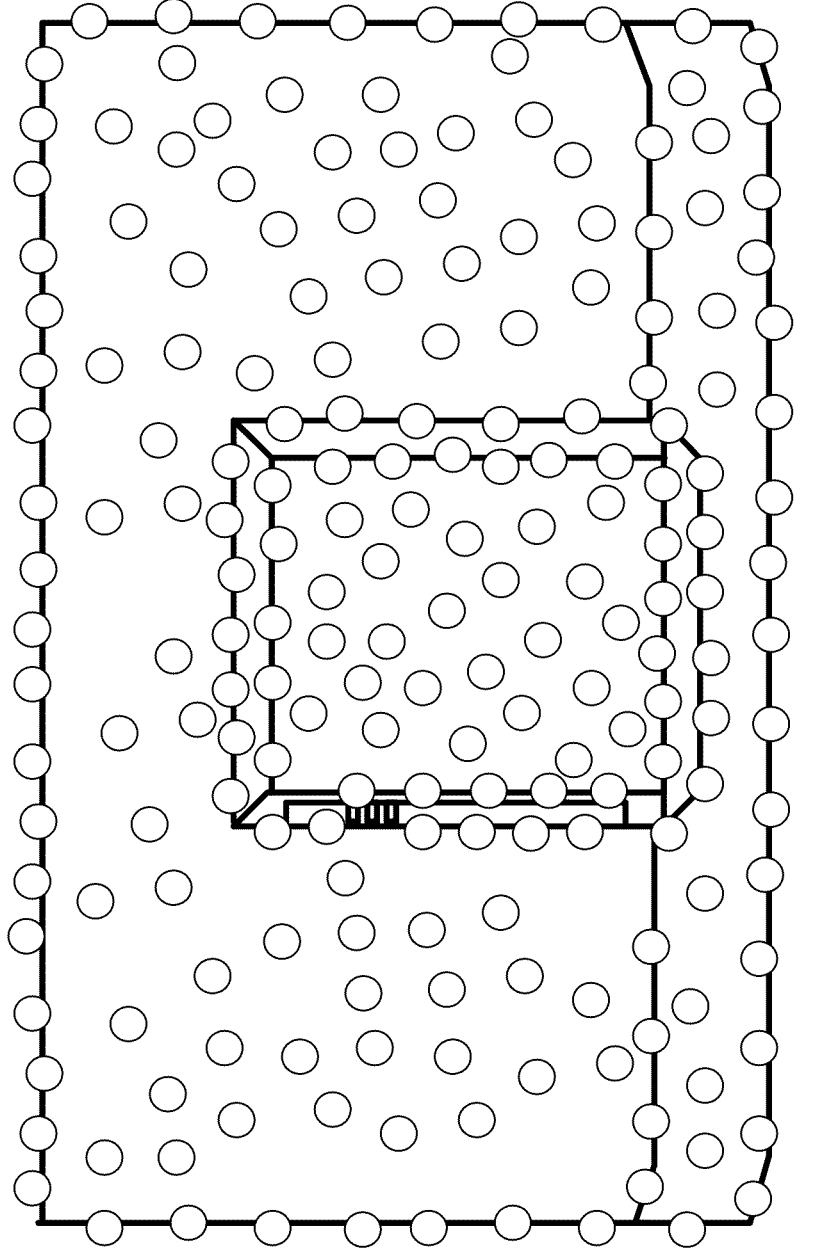
Figure 4B:
Figure 4C:
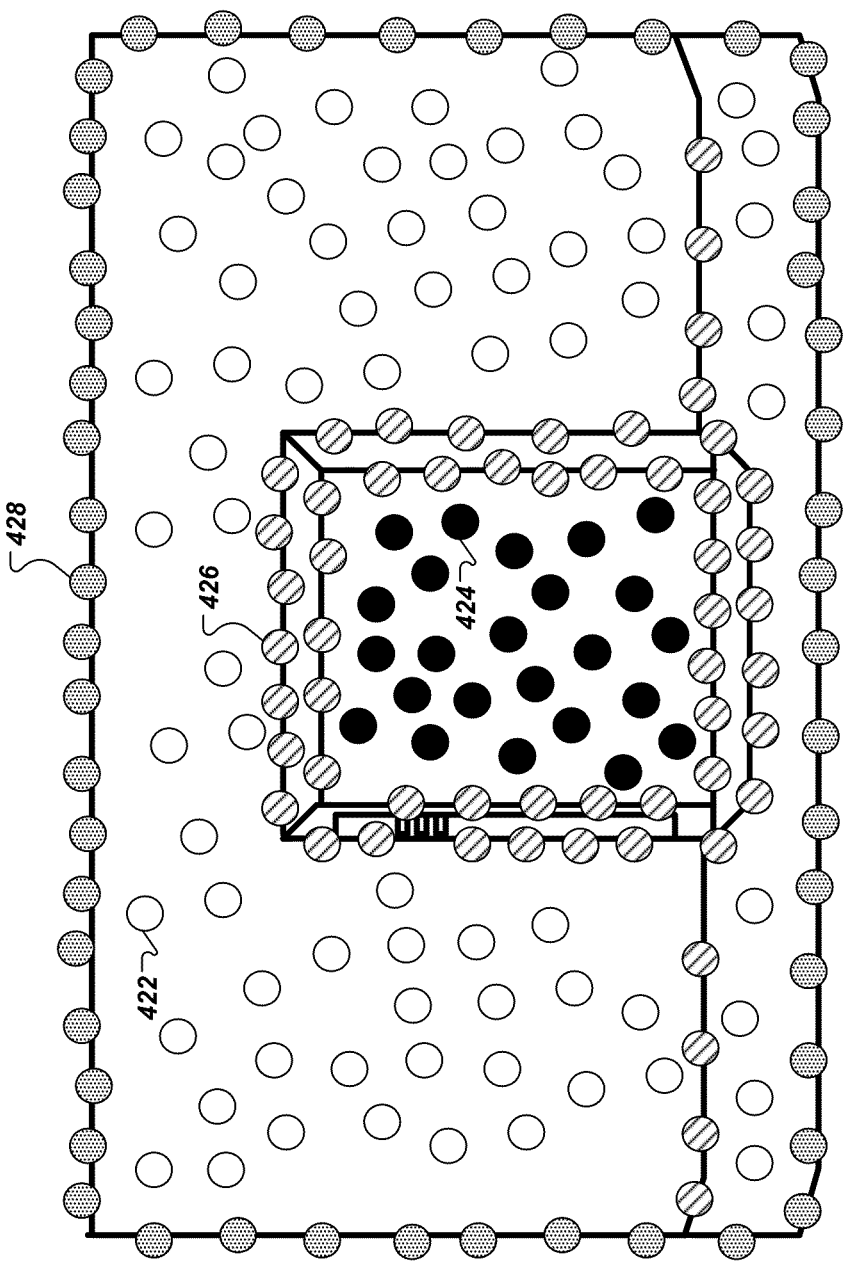

FIGS. 4A, 4B, and 4C illustrate how edges extracted from point cloud data can be classified. FIG. 4A illustrates edges of an object, in this example, the back panel 400 of a television display. The back panel of a television display is highly planar and flexible, and thus likely to be a deformable object when subjected to the forces of gravity or robots.

The panel 400 has two highly planar regions 410 and 420. Separating them are sharp internal edges.

FIG. 4B illustrates example point cloud data. In FIG. 4B, every circle is a point that was detected by a depth sensor to form a depth map.

FIG. 4C illustrates how the different points in the point cloud can be classified as belonging to different types of edges or planes.

Points on the first planar region 410, e.g., point 422, are illustrated as points with no fill pattern. Points on the second planar region 420, e.g., 424, are illustrated with a solid fill pattern.

Points along internal edges of the panel 400, e.g., point 426, are illustrated as points having a hatched fill pattern. Finally, points along silhouette edges of the panel 400, e.g., point 428, are illustrated as points having a dotted fill pattern.

The internal edge points, the silhouette edge points, or both can be used to extract edges from the point cloud data of the panel. Thus, instead of an edge being represented as a collection of points, the system can represent the edge as a line or a vector having a line direction in 3D space. In addition, the system can maintain data representing the surface normals of surfaces that are adjacent to the edges extracted from the point cloud data.

The system can use these differently classified points for different purposes when generating constraints. For example, the planar points belonging to the first planar region 410 and 420 can be used to generate point-to-plane constraints. The internal edge points, or equivalently, line representations derived from internal edge points, can be used to generate edge-to-edge constraints. The silhouette edge points can also be used to generate edge-to-edge constraints, although in some implementations their influence is attenuated or ignored entirely because internal edge points tend to be more useful for accurate deformation modeling and fast convergence.

The system can use any appropriate technique to extract edges from point cloud data. A first example technique uses a gradient image and line fitting. First, the system computes a gradient image of the depth map. The system can then sample the entire image and for each sample, the system can consider its local neighborhood and can gather a set of high gradient samples with similar gradient direction, fit a line to the samples using a weighted principal component analysis, where each neighbor is weighted by the gradient strength. And if the analysis shows a strongly favored direction, the system can consider the sample an edge and record the direction as the edge direction.

A second example technique uses a random sample consensus (RANSAC) procedure to fit two dominant planes. First, the system can sample the entire depth map and for each sample, the system can perform one or more RANSAC iterations to find a plane in a local neighborhood of points. If no plane is found, the samples can be rejected. Otherwise, the system removes all points belonging to that plane from the neighborhood point set and can use RANSAC again to find a second plane. If two planes are found, the system can consider the intersection between the planes as an edge.

After extracting edges from the point cloud data, the system can generate edge constraints if edges satisfy one or more edge constraint preconditions. A first edge constraint precondition is that the extracted edge from the sensor data should have a matching direction to a corresponding edge in the nominal representation. In other words, the system can compute a difference in the edge direction between the extracted edges and edges in the nominal representation and consider them to match if the difference satisfies a threshold.

A second edge constraint precondition is that the normal vectors of adjacent surfaces should match. In other words, the system can check to see if pairs of adjacent surfaces along the edge should have substantially matching normal vectors. If adjacent edges for a candidate edge have substantially different normal vectors, the system can discard the edge as a candidate for an edge-to-edge constraint.

A third edge constraint precondition is that the edge must be visible in the sensor data. In other words, the system can bypass generating an edge-to-edge constraint if an edge in the nominal representation is not visible in the sensor data. As part of this process, the system can for example render the deformed mesh into an image, e.g., by deforming the nominal mesh according to the current deformation estimate, to determine which edges of the workpiece are visible in the sensor data.

Lastly, the system can optionally use only internal edges rather than silhouette edges. In other words, if an edge is classified as a silhouette edge, the system can bypass generating an edge-to-edge constraint for that edge.

Edges that match all the edge constraint preconditions can then be modeled as point-to-line constraints according to:

$$\sum_{i}^{N} (f(x_i) - c_i)^T Q_i (f(x_i) - c_i),$$

where Q is given by:

$$Q = I - d_i d_i^T,$$

and $d_i$ is the edge direction.

As shown in FIG. 3, after generating constraints, the system adjusts the current deformation estimate (340). Adjusting the current deformation estimate essentially involves finding the values for the control points that minimize an objective function.

The system can use an objective function that attempts to minimize the forces required for a particular deformation as well as the distance between the deformation estimate and the sensor data. These deviations can be referred to as energy for a particular candidate deformation. In some implementations, the system uses an energy-minimization objective function given by:

$$E(f) = E_{elastic}(f) + E_{data}(f),$$

where $E_{elastic}(f)$ reflects the physical properties of the shape, while the data term $E_{data}(f)$ incorporates the constraints discussed above and essentially represents the distance between the current estimate of the deformed workpiece and the observed sensor data.

The system determines whether a stopping condition has been reached (350). In some implementations, the system computes a metric representing a difference between the previous iteration and the current iteration. If the difference is small enough to satisfy a threshold, the system can determine that the stopping condition is reached. Alternatively or in addition, the system can cap the number of iterations or the amount of time that has passed.

If the stopping condition has not been reached, the system recomputes the constraints with the updated estimate of the deformation of the workpiece (branch to 330).

Otherwise, the system adjusts a manipulation task according to the final deformation estimate (360). The final deformation estimate can define a continuous deformation field through which the manipulation task can be adjusted. For example, for path-based tasks such as gluing or sanding, the system can transform the path using the continuous deformation field. For tasks that involve grasping deformed objects, the system can deform the grasping points according to the continuous deformation field defined by the deformation estimate.

The system can also make other adjustments to the manipulation task based on the deformation estimate. As one example, the system can evaluate a workpiece according to the edge-to-edge constraints and can reject the workpiece if one or more evaluation criteria are not satisfied. For example, the system can compute a number of matching edges between the nominal representation and the edges extracted from the point cloud data. If fewer than a threshold number of edge-to-edge constraints can be established, the system can reject the workpiece as being too atypical or too deformed or the sensor data too unreliable for automatic manipulation. By rejecting the workpiece from the process, the system can automatically prevent damage or destruction of workpieces due to an unreliable sensor reading.

The system can also use the edge-to-edge constraints to evaluate the quality of the deformation estimate itself. To do so, the system can also count the number of matching edges between the nominal representation and the edges extracted from the point cloud data. The system can then compute a score representing a quality of the obtained deformation model. The score can alternatively or in addition be based on other aspects of the deformation model, such as the number of matching points in the point-to-plane constraints.

If the evaluated quality of the deformation estimate does not satisfy a threshold, the system can reject the workpiece or raise an error that triggers a recovery operation or human intervention.

Another advantage of the techniques described in this specification is that they are easily adapted to simulation environments. In other words, it is relatively straight-forward to adapt edge-to-edge constraints to a simulation environment in which workpieces are deformed randomly.

This is because edges are relatively easy to extract from simulated data in a way that generalizes to real-world operating environments.

Deformation quality estimates and simulations can also be used to guide the placement of sensors in a workcell. For example, the system can use simulations and simulated deformations to evaluate an overall score for the placement of a sensor. For example, the system can randomly deform 100 workpieces, evaluate the quality of deformations obtained from one or more sensors in a particular location, and compute deformation quality estimates from the resulting edge-to-edge constraints, point-to-plane constraints, or both. The system can repeat this process in simulation for an arbitrary number of candidate sensor locations in order to select a sensor location that provides the highest quality deformation estimates.

In this specification, a robot is a machine having a base position, one or more movable components. Robots typically have an associated kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a nominal representation of a workpiece for a robotic process that involves one or more robots performing a manipulation task on multiple instances of the workpiece, wherein the nominal representation represents geometry of the workpiece before deformation;
   receiving point cloud data captured by a sensor for a deformed workpiece;
   generating deformation data for the deformed workpiece that represents how the deformed workpiece differs from the nominal representation of the workpiece, including performing an iterative process that repeatedly updates a current estimate of the deformation data until a stopping condition is reached, including, on each step of the iterative process, performing operations comprising:

computing edge-to-edge constraints that match one or more edges in the point cloud data to one or more edges in the nominal representation, including:

analyzing the current estimate of the deformation data to extract edges, classifying the extracted edges as being interior edges or silhouette edges, and matching edges classified as being interior edges while ignoring silhouette edges, and adjusting a current estimate of the deformation data according to the computed edge-to-edge constraints;

adjusting the manipulation task according to the generated deformation data; and performing the robotic process on the deformed workpiece using the manipulation task adjusted according to the generated deformation data.

2. The method of claim 1, wherein extracting edges comprises extracting only visible edges that can be observed by the sensor.

3. The method of claim 1, wherein computing the edge-to-edge constraints comprises:

determining whether a first edge in the nominal representation has a same edge direction as a second edge extracted from the point cloud data.

4. The method of claim 1, wherein computing the edge-to-edge constraints comprises:

determining whether normal vectors of surfaces along a first edge in the nominal representation match normal vectors of corresponding surfaces in the point cloud data.

5. The method of claim 1, further comprising:

evaluating the deformed workpiece according to the edge-to-edge constraints; and rejecting the deformed workpiece if a result of the evaluation does not satisfy one or more evaluation criteria.

6. The method of claim 5, wherein evaluating the deformed workpiece according to the edge-to-edge constraints comprises:

computing a number of matching edges between the nominal representation and the edges extracted from the point cloud data, wherein determining whether the result of the evaluation satisfies the one or more evaluation criteria comprises comparing the computed number of matching edges to a threshold number of matching edges.

7. The method of claim 1, further comprising:

computing a score for the deformation data according to the edge-to-edge constraints; and raising an error if the score for the deformation data does not satisfy one or more quality criteria.

8. A system comprising:

one or more computers and one or more storage devices storing instructions that are operable, when executed by the one or more computers, to cause the one or more computers to perform operations comprising:

receiving a nominal representation of a workpiece for a robotic process that involves one or more robots performing a manipulation task on multiple instances of the workpiece, wherein the nominal representation represents geometry of the workpiece before deformation;

receiving point cloud data captured by a sensor for a deformed workpiece;

generating deformation data for the deformed workpiece that represents how the deformed workpiece differs from the nominal representation of the workpiece, including performing an iterative process that repeatedly updates a current estimate of the deformation data until a stopping condition is reached, including, on each step of the iterative process, performing operations comprising:

computing edge-to-edge constraints that match one or more edges in the point cloud data to one or more edges in the nominal representation, including:

analyzing the current estimate of the deformation data to extract edges, classifying the extracted edges as being interior edges or silhouette edges, and matching edges classified as being interior edges while ignoring silhouette edges, and adjusting a current estimate of the deformation data according to the computed edge-to-edge constraints;

adjusting the manipulation task according to the generated deformation data; and performing the robotic process on the deformed workpiece using the manipulation task adjusted according to the generated deformation data.

9. The system of claim 8, wherein extracting edges comprises extracting only visible edges that can be observed by the sensor.

10. The system of claim 8, wherein computing the edge-to-edge constraints comprises:

determining whether a first edge in the nominal representation has a same edge direction as a second edge extracted from the point cloud data.

11. The system of claim 8, wherein computing the edge-to-edge constraints comprises:

determining whether normal vectors of surfaces along a first edge in the nominal representation match normal vectors of corresponding surfaces in the point cloud data.

12. The system of claim 8, wherein the operations further comprise:

evaluating the deformed workpiece according to the edge-to-edge constraints; and rejecting the deformed workpiece if a result of the evaluation does not satisfy one or more evaluation criteria.

13. The system of claim 12, wherein evaluating the deformed workpiece according to the edge-to-edge constraints comprises:

computing a number of matching edges between the nominal representation and the edges extracted from the point cloud data, wherein determining whether the result of the evaluation satisfies the one or more evaluation criteria comprises comparing the computed number of matching edges to a threshold number of matching edges.

14. The system of claim 8, wherein the operations further comprise:

computing a score for the deformation data according to the edge-to-edge constraints; and raising an error if the score for the deformation data does not satisfy one or more quality criteria.

15. One or more non-transitory computer storage media encoded with computer program instructions that when executed by one or more computers cause the one or more computers to perform operations comprising:

receiving a nominal representation of a workpiece for a robotic process that involves one or more robots performing a manipulation task on multiple instances of the workpiece, wherein the nominal representation represents geometry of the workpiece before deformation;

receiving point cloud data captured by a sensor for a deformed workpiece;

generating deformation data for the deformed workpiece that represents how the deformed workpiece differs from the nominal representation of the workpiece, including performing an iterative process that repeatedly updates a current estimate of the deformation data until a stopping condition is reached, including, on each step of the iterative process, performing operations comprising:

computing edge-to-edge constraints that match one or more edges in the point cloud data to one or more edges in the nominal representation, including:

analyzing the current estimate of the deformation data to extract edges, classifying the extracted edges as being interior edges or silhouette edges, and matching edges classified as being interior edges while ignoring silhouette edges, and adjusting a current estimate of the deformation data according to the computed edge-to-edge constraints;

adjusting the manipulation task according to the generated deformation data; and performing the robotic process on the deformed workpiece using the manipulation task adjusted according to the generated deformation data.

16. A computer-implemented method comprising:

receiving a nominal representation of a workpiece for a robotic process that involves one or more robots performing a manipulation task on multiple instances of the workpiece, wherein the nominal representation represents geometry of the workpiece before deformation;

receiving point cloud data captured by a sensor for a deformed workpiece;

generating deformation data for the deformed workpiece that represents how the deformed workpiece differs from the nominal representation of the workpiece, including performing an iterative process that repeatedly updates a current estimate of the deformation data until a stopping condition is reached, including, on each step of the iterative process, performing operations comprising:

computing edge-to-edge constraints that match one or more edges in the point cloud data to one or more edges in the nominal representation, including determining whether normal vectors of surfaces along a first edge in the nominal representation match normal vectors of corresponding surfaces in the point cloud data, and adjusting a current estimate of the deformation data according to the computed edge-to-edge constraints;

adjusting the manipulation task according to the generated deformation data; and performing the robotic process on the deformed workpiece using the manipulation task adjusted according to the generated deformation data.

17. A system comprising:

one or more computers and one or more storage devices storing instructions that are operable, when executed by the one or more computers, to cause the one or more computers to perform operations comprising:

receiving a nominal representation of a workpiece for a robotic process that involves one or more robots performing a manipulation task on multiple instances of the workpiece, wherein the nominal representation represents geometry of the workpiece before deformation;

receiving point cloud data captured by a sensor for a deformed workpiece;

generating deformation data for the deformed workpiece that represents how the deformed workpiece differs from the nominal representation of the workpiece, including performing an iterative process that repeatedly updates a current estimate of the deformation data until a stopping condition is reached, including, on each step of the iterative process, performing operations comprising:

computing edge-to-edge constraints that match one or more edges in the point cloud data to one or more edges in the nominal representation, including determining whether normal vectors of surfaces along a first edge in the nominal representation match normal vectors of corresponding surfaces in the point cloud data, and adjusting a current estimate of the deformation data according to the computed edge-to-edge constraints;

adjusting the manipulation task according to the generated deformation data; and performing the robotic process on the deformed workpiece using the manipulation task adjusted according to the generated deformation data.

18. A computer-implemented method comprising:

receiving a nominal representation of a workpiece for a robotic process that involves one or more robots performing a manipulation task on multiple instances of the workpiece, wherein the nominal representation represents geometry of the workpiece before deformation;

receiving point cloud data captured by a sensor for a deformed workpiece;

generating deformation data for the deformed workpiece that represents how the deformed workpiece differs from the nominal representation of the workpiece, including performing an iterative process that repeatedly updates a current estimate of the deformation data until a stopping condition is reached, including, on each step of the iterative process, performing operations comprising:

computing edge-to-edge constraints that match one or more edges in the point cloud data to one or more edges in the nominal representation, and adjusting a current estimate of the deformation data according to the computed edge-to-edge constraints;

evaluating the deformed workpiece according to the edge-to-edge constraints, including computing a number of matching edges between the nominal representation and the edges extracted from the point cloud data;

rejecting the deformed workpiece if the result of the evaluation does not satisfy one or more evaluation criteria, wherein the one or more evaluation criteria comprises comparing the computed number of matching edges to a threshold number of matching edges; and if the result of the evaluation satisfies the one or more evaluation criteria, adjusting the manipulation task according to the generated deformation data and performing the robotic process on the deformed workpiece using the manipulation task adjusted according to the generated deformation data.

19. A system comprising:

one or more computers and one or more storage devices storing instructions that are operable, when executed by the one or more computers, to cause the one or more computers to perform operations comprising:

receiving a nominal representation of a workpiece for a robotic process that involves one or more robots performing a manipulation task on multiple instances of the workpiece, wherein the nominal representation represents geometry of the workpiece before deformation;

receiving point cloud data captured by a sensor for a deformed workpiece;

generating deformation data for the deformed workpiece that represents how the deformed workpiece differs from the nominal representation of the workpiece, including performing an iterative process that repeatedly updates a current estimate of the deformation data until a stopping condition is reached, including, on each step of the iterative process, performing operations comprising:

computing edge-to-edge constraints that match one or more edges in the point cloud data to one or more edges in the nominal representation, and adjusting a current estimate of the deformation data according to the computed edge-to-edge constraints;

evaluating the deformed workpiece according to the edge-to-edge constraints, including computing a number of matching edges between the nominal representation and the edges extracted from the point cloud data;

rejecting the deformed workpiece if the result of the evaluation does not satisfy one or more evaluation criteria, wherein the one or more evaluation criteria comprises comparing the computed number of matching edges to a threshold number of matching edges; and if the result of the evaluation satisfies the one or more evaluation criteria, adjusting the manipulation task according to the generated deformation data and performing the robotic process on the deformed workpiece using the manipulation task adjusted according to the generated deformation data.

* * * * *